United States Patent [19]

Buckley et al.

[11] Patent Number: 4,850,241
[45] Date of Patent: Jul. 25, 1989

[54] CABLE TENSION EQUALIZER FOR A LEVER OPERATED BRAKE ACTUATOR

[75] Inventors: James A. V. Buckley, Whitefish Bay; Allan E. Prusak, Grafton, both of Wis.

[73] Assignee: Hayes Industrial Brake, Inc., Mequon, Wis.

[21] Appl. No.: 136,823

[22] Filed: Dec. 22, 1987

[51] Int. Cl.⁴ ............................ G05G 9/00; G05G 5/06
[52] U.S. Cl. ................................... 74/502.2; 74/489; 74/523; 74/471 R; 188/24.16; 188/84.18; 188/24.22
[58] Field of Search ................... 74/489, 502.2, 501.5, 74/523, 471; 188/2 D, 24.16, 24.15, 24.18, 24.22

[56] References Cited

U.S. PATENT DOCUMENTS

| 2,319,368 | 5/1943 | Schnell | 74/471 X |
| 4,624,350 | 11/1986 | Akashi | 74/489 |
| 4,644,816 | 2/1987 | Cockburn | 74/489 |

FOREIGN PATENT DOCUMENTS

| 931156 | 8/1955 | Fed. Rep. of Germany | 74/489 |
| 666334 | 12/1928 | France | 74/489 |
| 431809 | 3/1948 | Italy | 74/489 |
| 22928 | of 1913 | United Kingdom | 74/489 |
| 222489 | 10/1924 | United Kingdom | 74/489 |

Primary Examiner—Gary L. Smith
Assistant Examiner—Flemming Saether
Attorney, Agent, or Firm—Foley & Lardner

[57] ABSTRACT

A lever operated brake actuator for an all terrain vehicle, the actuator including a housing and a lever arm pivotally mounted in the housing, the lever arm including an arcuate curved groove, a cable equalizer in the form of a unitary member having a spherical or ball shaped center section and a pair of prongs forming a slot at each end of the equalizer, a connecting member is provided on the end of each cable, the connecting members being positioned in the slots between the prongs, the connecting members being free to pivot in the slots in the equalizer to maintain equal tension on the brake cables and the equalizer being able to pivot in the bath of motion of the lever arm to maintain a straight line connection of the cables to the equalizer.

7 Claims, 2 Drawing Sheets

CABLE TENSION EQUALIZER FOR A LEVER OPERATED BRAKE ACTUATOR

BACKGROUND OF THE INVENTION

Hand operated brake actuators of the type contemplated herein are described in co-pending application Ser. No. 07/071,490 filed on July 9, 1987, and entitled "Hand Operated Brake Actuator" and assigned to the same assignee. As described therein such actuators are operated by the driver by squeezing or pushing a lever arm toward the handle bar to apply tension to the brake cables. The tension on the cables is maintained by an equalizer which is mounted on the lever arm for pivotal movement in the plane of the cables. The brake cables are connected to the equalizer by means of a ball mounted on the end of the cable and positioned in slots on each end of the equalizer. When the lever arm is pivoted between the open and closed positions the cable is subjected to a bending action at the point of entrance of the cable into the equalizer. This bending action reduces the life of the cables due to the weakening of the cable causing it to break.

SUMMARY OF THE INVENTION

The cable tension equalizer, according to the present invention, is formed from a unitary member having a spherical center section or ball which is mounted for pivotal motion in a corresponding socket in the lever arm. The member has a pair of prongs extending outwardly from both ends which form slots for connection to the brake cables. The equalizer is positioned in a curved slot or socket in the lever arm which corresponds to the curve of the spherical section of the equalizer to allow the equalizer to pivot in the socket both in the plane of the cables as well as the plane of motion of the lever arm. The brake cables are connected to the equalizer by cylindrical connecting members mounted on the ends of the cables which fit into corresponding curved slots in the equalizer. A curved groove is provided on the back of the prongs to allow the cable ends to pivot within the slots in the equalizer when the equalizer pivots in the lever arm to equalize the tension on the cables.

One of the primary features of the invention is the ability of the equalizer to simultaneously pivot both in the vertical plane of motion of the lever arm and in the horizontal plane of the brake cables to maintain a straight line connection of the cables to the equalizer at all positions of the equalizer and thereby reduce the bending of the brake cables.

A further feature of the invention is the provision of an opening in the arcuate curved groove in the lever arm which prevents the removal of the equalizer from the lever arm when connected to the cables.

A further feature of the invention is the provision of cylindrical members at the ends of the cablew which fit into corresponding curved grooves on the equalizer to allow the cables to pivot with respect to the equalizer when the equalizer pivots in the lever arm in response to changes in the tension on the cables.

A further feature of the invention is the ability of the equalizer to maintain tension on one of the brake cables if the other cable breaks.

Other principal features and advantages of the invention will become apparent to those skilled in the art upon review of the following detailed description, claims and drawings.

Figure 1:
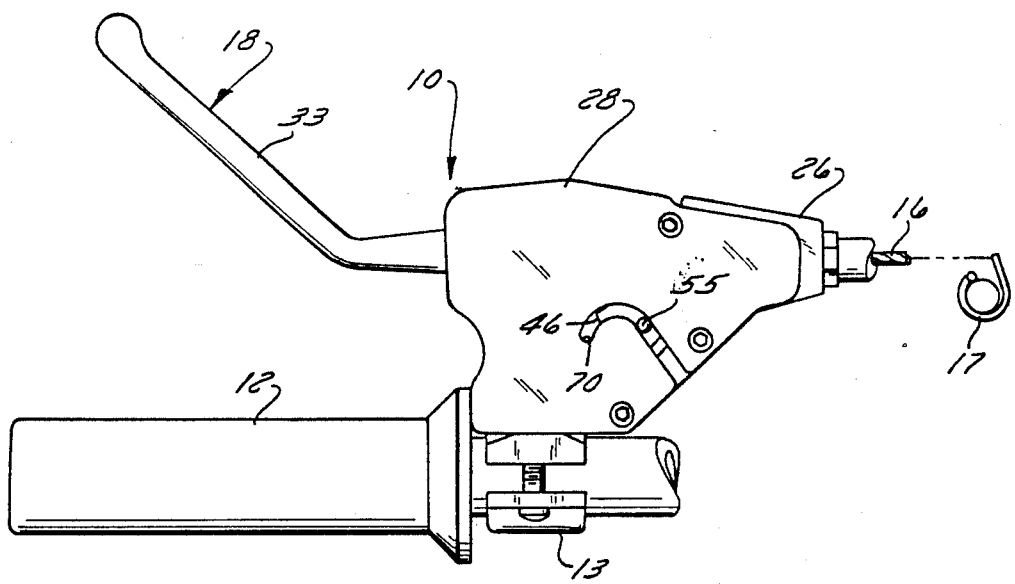
FIG. 1 is a side elevation view of the lever operated brake actuator shown mounted on the handle bar of a vehicle.
Figure 2:
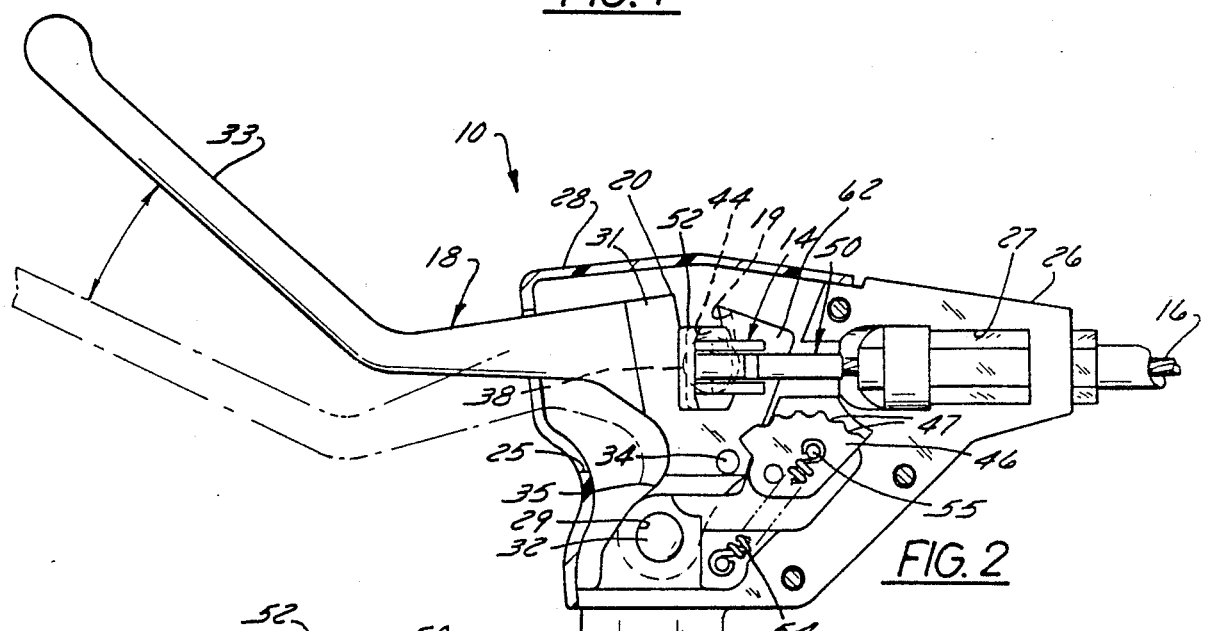
FIG. 2 is a side elevation view of the brake actuator partly in section showing the lever arm in the release position.
Figure 4:
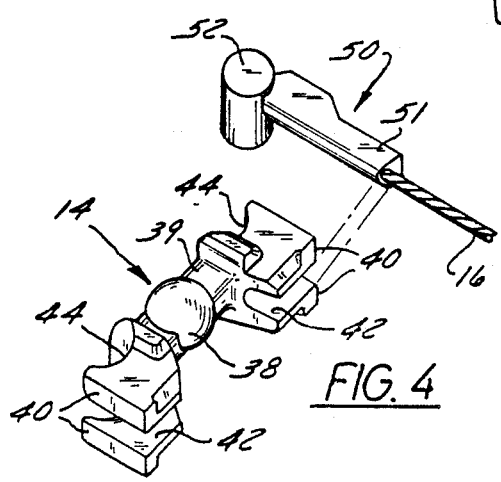
FIG. 4 is an exploded perspective view of the cable tension equalizer and the cable connector on the end of the brake cables.

Although only one embodiment of the invention is explained in detail, it is to be understood that the invention is not limited in its application tot he details of construction and the arrangements of the components set forth in the following description or illustrated in the drawings. The invention is capable of other embodiments and of being practiced or being carried out in various ways. Also, it is to be understood, that the phraseology and terminology used herein is for the purpose of description and should not be regarded as limiting.

DETAILED DESCRIPTION OF THE INVENTION

Referring to the drawings, the lever operated brake actuator 10 includes a housing 26 which is shown mounted on the handlebar 12 of an all terrain vehicle, ATV, by means of a clamp 13. An ATV refers to a vehicle of the type having three to six wheels. A lever arm 18 is pivotally mounted in the housing 26. A cable tension equalizer 14 is mounted in the lever arm 18 and is connected to the brake cables 16. One of the brake cables 16 is shown schematically connected to a brake housing 17. The actuator is operated by pivoting the lever arm 18 toward the handle bar 12 to apply tension to the brake cables 16. A cam segment 46 is pivotally mounted on the housing 26 to lock the lever arm 18 in the brake position. The cam segment 46 is pivoted by means of a pin 55 which extends through a slot 70 in cover 28. The cam segment 46 is moved into engagement with a pin 34 provided on the lever arm 18 and biased by an over center spring 54 in the brake lock and release positions.

Figure 3:
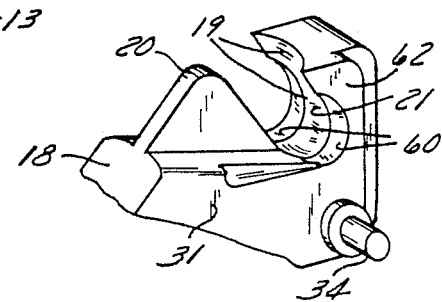
FIG. 3 is a perspective view of a portion of the lever arm showing the arcuate curved groove for the cable tension equalizer.
Figure 5:
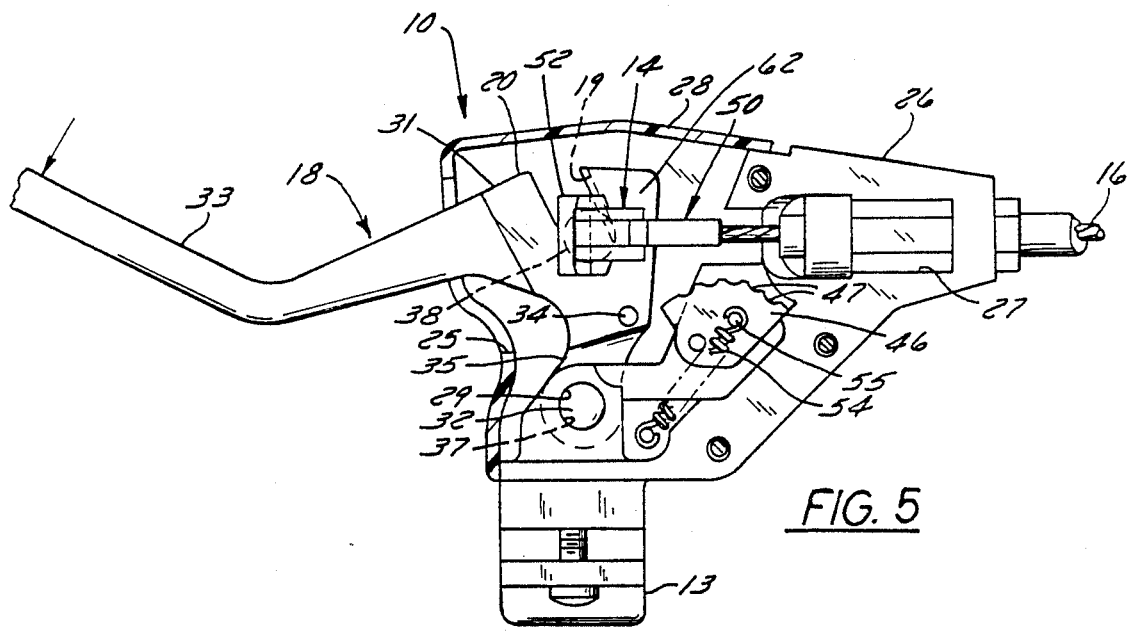
FIG. 5 is a side elevational view similar to FIG. 2 showing the lever arm in the brake applied position.
Figure 6:
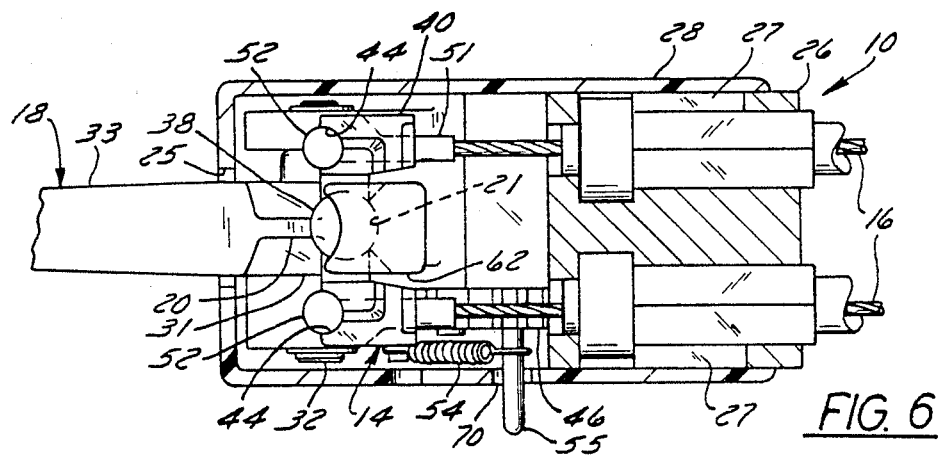
FIG. 6 is a top view partly in section showing the equalizer with equal tension on the cables.

The housing 26 includes a pair of cable openings 27 and a pivot pin opening 29. The lever arm 18 includes a main or body portion 31 having an actuating arm 33 extending outwardly from the body portion and a pivot section 35 having a mounting hole 37. The parking brake pin 34 is provided on the side of the body portion 31. Referring to FIG. 3, an arcuate groove 19 is provided in the body portion which has a curved surface 21. A triangular guide flange 20 is aligned with and spaced from the curved surface 21 of the arcuate groove 19. It should be noted that the distance between the flange 20 and the top of the curved surface 21 at the entrance to groove 19 is smaller than the distance of the flange 20 from the curved surface 21 at the bottom of groove 19 as discussed hereinafter. The housing 26 is enclosed by means of a cover 28 having an opening 25. The lever arm 18 is pivotally mounted on a pin 32 which passes through hole 29 in the housing 26 and hole 37 in the pivot section 35. The actuating arm 33 extends outwardly through the opening 25 in the cover 28.

The brake cables 16 are connected to the cable equalizer 14 by means of the cable connectors 50 which are formed on the ends of the cables 16. In this regard, each cable connector 50 includes a flat body 51 having a cylindrical section 52 at the end.

The equalizer 14 is free to pivot both in the horizontal plane of the brake cables 16 and in the vertical plane of pivot motion of the lever arm 18 in order to maintain a straight line connection between the cables 16 and the equalizer 14. In this regard, the equalizer 14 is formed from a unitary member 39 having a spherical shaped center section 38 which is slightly shorter in height than width. A pair of prongs 40 are provided on each end of the member 39 and are spaced apart a distance to form a slot 42 for the flat body 51 of the cable connector 50. The slots 42 lie in a common plane which passes through the center of the spherical section 38 of the equalizer 14 and in the same plane as the cables 16. A curved groove 44 is provided the back of each of the pairs of prongs 40 and is perpendicualr to the plane of the slots 42.

The equalizer 14 is mounted in the arcuate groove 19 in the lever arm by turning the prongs 40 down so that the shorter dimension of the spherical section 38 can pass through the opening between the curved surface 21 and the triangular flange 20. The space between the surface of the flange 20 and the curve of the groove 19 being wide enough to allow for the spherical section to pass through the space when the prongs are turned down and to prevent the removal of the spherical section when the prongs are turned up for connection to the cables 16. With this arrangement the equalizer 14 cannot be removed from the lever arm 18 when connected to the cables 16.

The equalizer 14 is connected to the cables 16 by sliding the flat body section 51 of the cables 16 into the slots 42 in prongs 40 with the cylindrical section 52 seated in the curved groove 44 on the back of the equalizer. The flat section 51 has a thickness substantially equal to the thickness of the slots 42 and the cylindrical section 52 has a diameter corresponding to the radius of the curved groove 44. With this arrangement, the cylindrical section 52 is free to pivot in groove 44 when the equalizer pivots in the plane of the cables 16. When the lever arm 18 is pivoted in the housing 26, the equalizer 14 will pivot in groove 19 with respect to the plane of motion of the lever arm 18 so that slots 42 remain in the plane of the cables.

Figure 7:
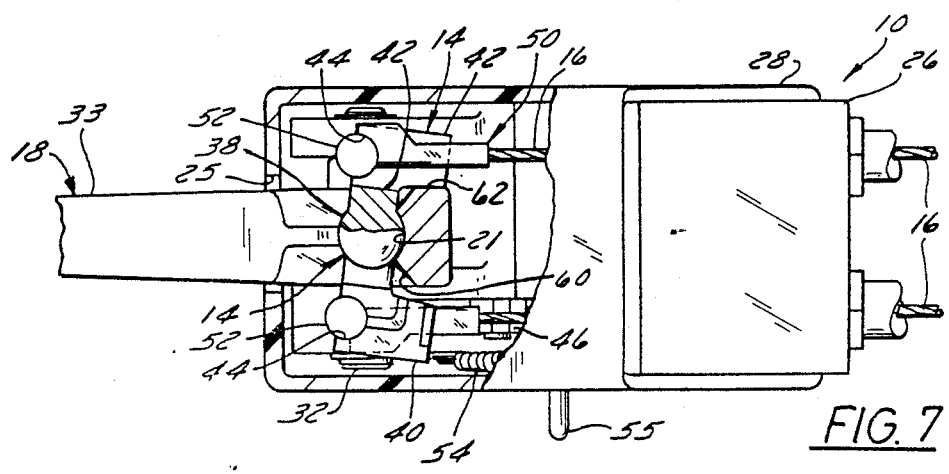
FIG. 7 is a view similar to FIG. 6 showing the position of the equalizer when one of the cables is broken.

Means are provided on the lever arm 18 to limit the pivotal motion of the equalizer 14 in the event one of the cables 16 breaks to maintain tension on the other cable. Such means is in the form of a face 62 provided on each side of the ridge 60 on lever arm 18. The face 62 is located in the path of motion of the corresponding surface of the equalizer 14 as seen in FIG. 7 to provide a fixed stop for the equalizer 14.

Although the invention has been described as a lever operated brake actuator, it is within the contemplation of the invention to operate the lever arm by either by hand or foot. The actuator can also be used to operate pairs of brake cables for both the front and/or back wheels of the vehicle.

We claim:

1. A lever operated brake actuator for an all terrain vehicle of the type having brake cables connected to the brakes for the wheels of the vehicle, said actuator comprising:
   a housing adapted to be mounted on the vehicle,
   a lever arm pivotally mounted on said housing,
   a cable tension equalizer mounted on said lever arm and being operatively connected to the brake cables,
   said equalizer comprises a unitary member having a spherical center section and a pair of prongs on each side of said center section, each pair of prongs defining a slot on each end of said unitary member, said slots lying in a common plane which passes through the center of said spherical section, said unitary member being mounted in said lever arm for pivotal motion in both the plane of motion of the lever arm and in the plane of motion of the cables, whereby the cables remain in a straight line on pivotal motion of said lever arm.

2. The actuator according to claim 1 wherein said lever arm includes an arcuate groove having a curved surface and said spherical section of said equalizer is seated on said curved surface of said groove.

3. The actuqtor according to claim 2 wherein said lever arm includes means in said groove for limiting the pivotal motion of the equalizer in the plane of the cables to maintain tension on one cable if the other cable breaks.

4. The actuator according to claim 1 including connection means mounted on the ends of the cables and being positioned in said slots.

5. The actuator according to claim 4 wherein said equalizer includes a cylindrical groove on the back of each end of the equalizer and located in a perpendicular relation to said slots in said prongs and said connecting means includes a cylindrical member on the end which is aligned in said groove to allow said connecting means to pivot in said groove when said equalizer pivots in the plane of the cables.

6. A lever operated brake actuator for an all terrain vehicle of the type having brake cables connected to the brakes for the wheels of the vehicle, said actuator comprising:
   a housing adapted to be mounted on the vehicle,
   a lever arm pivotally mounted on said housing,
   a cable tension equalizer mounted on said lever arma nd being operatively connected to the brake cables,
   said equalizer comprises a unitary member having a spherical center section and being mounted in said lever arm for pivotal motion in both the plane of motion of the lever arm and the plane of motion of the cables, whereby the cables remain in a straight line on pivotal motion of said lever arm,
   said lever arm includes an arcuate groove having a curved surface and said spherical section of said equalizer is seated on said curved surface of said groove,
   wherein said spherical section of said equalizer is shorter in height than width and said lever arm includes a flange located in a spaced relation to said groove to define an opening between said flange and said curved groove which is greater than the height of said spherical section and smaller than the width of said spherical section whereby the spherical section must be turned in said groove to allow the spherical section to pass through the opening and cannot be removed from the groove when the equalizer is connected to the cables.

7. A cable tension equalizer assembly for a lever operated brake actuator of the type having a lever arm mounted for pivotal motion on the handle bar to apply tension to the brake cables for the brakes on the rear wheels of an all terrain vehicle, said equalizer assembly comprising a unitary member having a spherical center section and a pair of prongs defining a slot on each side of said center section, said slots lying in a plane which passes through the center of said spherical center section, said spherical center section being mounted for pivotal motion in the plane of motion of the lever arm and in the plane of said slots in said prongs, and connecting means on the end of each brake cable positoined in said slots in said member whereby on pivotal motion of said lever arm said equalizer will pivot in said lever arm to maintain equal tension on the brake cables.

* * * * *